(12) United States Patent
Penninckx et al.

(10) Patent No.: US 6,710,904 B1
(45) Date of Patent: Mar. 23, 2004

(54) SYSTEM FOR COMPENSATING POLARIZATION DISPERSION IN AN OPTICAL TRANSMISSION SYSTEM

(75) Inventors: Denis Penninckx, Nozay (FR); Stéphanie Lanne, Paris (FR); Jean-Pierre Hamaide, St Germain les Arpajon (FR)

(73) Assignee: Alcatel, Paris (FR)

( * ) Notice: Subject to any disclaimer, the term of this patent is extended or adjusted under 35 U.S.C. 154(b) by 749 days.

(21) Appl. No.: 09/599,507

(22) Filed: Jun. 23, 2000

(30) Foreign Application Priority Data

Jul. 8, 1999 (FR) .............................. 99 08846

(51) Int. Cl.$^7$ .............................................. H04B 10/18
(52) U.S. Cl. .................... 359/147; 398/81; 398/152; 398/194
(58) Field of Search ................. 398/81, 147–150, 398/159, 192–198, 208–209

(56) References Cited

U.S. PATENT DOCUMENTS

| | | | | |
|---|---|---|---|---|
| 6,104,515 A | * | 8/2000 | Cao | ............................ 398/147 |
| 6,130,766 A | * | 10/2000 | Cao | ............................ 398/147 |
| 6,178,021 B1 | * | 1/2001 | Bruyere et al. | ............... 398/83 |
| 6,271,952 B1 | * | 8/2001 | Epworth | ..................... 398/147 |
| 6,370,300 B1 | * | 4/2002 | Eggleton et al. | .............. 385/37 |
| 6,421,153 B1 | * | 7/2002 | Way et al. | .................. 398/152 |

FOREIGN PATENT DOCUMENTS

| EP | 0 700 178 A2 | 3/1996 |
|---|---|---|
| EP | 0 716 516 A1 | 3/1996 |

* cited by examiner

*Primary Examiner*—Leslie Pascal
(74) *Attorney, Agent, or Firm*—Sughrue Mion, PLLC

(57) ABSTRACT

To increase the bit rate at which and the distance over which data can be transmitted by optical fiber, polarization dispersion is compensated by means of a polarization controller, a system for generating a differential group delay between two orthogonal modes of polarization and a control unit of the polarization controller. A chromatic dispersion compensator applies compensation which is adjusted dynamically to optimize the quality of the received optical signal. Applications include long-haul optical transmission on standard fibers.

20 Claims, 1 Drawing Sheet

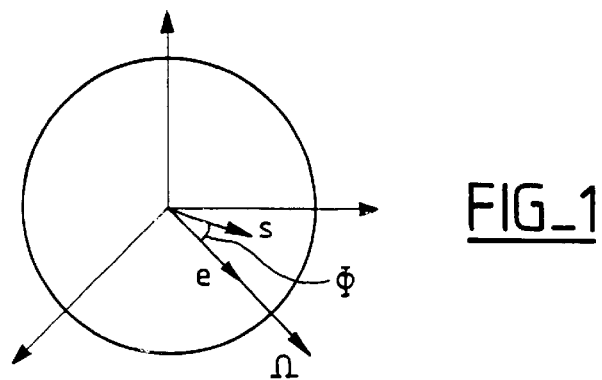
FIG_1
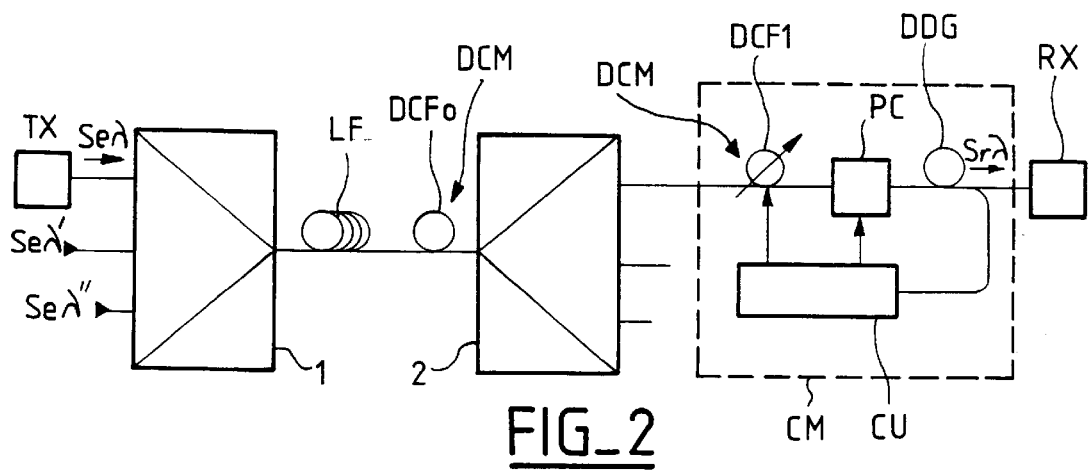
FIG_2
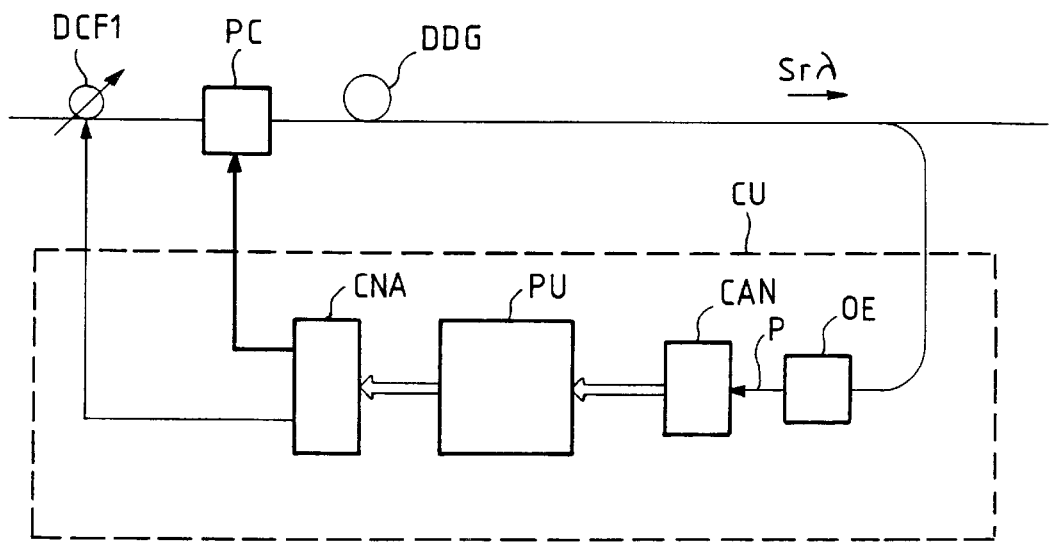
FIG_3

SYSTEM FOR COMPENSATING POLARIZATION DISPERSION IN AN OPTICAL TRANSMISSION SYSTEM

BACKGROUND OF THE INVENTION

1. Field of the Invention

The invention relates to the transmission of signals by optical means and more particularly to high bit rate transmission on long-haul links using optical fibers.

The invention relates to a system for dynamically compensating at least some polarization dispersion observed in fiber optic transmission systems.

2. Description of the Prior Art

A fiber optic transmission system typically includes:

- a transmitter terminal using at least one optical carrier wave whose optical frequency and/or power it modulates according to the data to be transmitted,
- an optical transmission line consisting of at least monomode fiber section conveying the signal emitted by the transmitter terminal, and
- a receiver terminal receiving the optical signal transmitted by the fiber.

The performance of an optical transmission system, in particular in terms of signal quality and bit rate, is limited in particular by the optical properties of the link, which is the site of physical phenomena which degrade the optical signals. Of all the various phenomena that have been identified, attenuation of the optical power and chromatic dispersion initially appeared to be the most severely constraining and means have been proposed for at least partially remedying the degradation that they cause.

The attenuation in fibers of a given type depends on the signal carrier wavelength. Monomode fibers installed during the past decade and referred to as "standard fibers" have a minimum attenuation at a wavelength around 1.5 $\mu$m, which shows the benefit of choosing this value for the carriers.

Also, to increase transmission distances further, attenuation has been compensated by means of optical amplifiers at the upstream or downstream end of the link or all along the link.

Chromatic dispersion also depends on wavelength. For standard fibers there is zero chromatic dispersion at 1.3 $\mu$m and the chromatic dispersion at 1.5 $\mu$m is approximately 1.7 ps/(km.nm). The low attenuation at 1.5 $\mu$m has led to the development of new fibers referred to as "dispersion shifted fibers" for which there is zero chromatic dispersion at this wavelength.

Nevertheless, to improve the performance of standard fibers already installed, attempts have been made to correct the effects of chromatic dispersion in these fibers at 1.5 $\mu$m.

One solution is to insert into the link at least one dispersion compensating fiber (DCF). To compensate the chromatic dispersion exactly, it is sufficient for the dispersion compensating fiber to have a length and dispersion characteristics such that the cumulative dispersion along the compensating fiber is equal and opposite to that created along the fiber of the transmission link.

A residual cumulative dispersion value DR can therefore be defined for the whole of the link, including the compensating fiber(s), as the algebraic sum of the cumulative dispersions DL and DC of the dispersion compensating fiber(s) and the fiber of the transmission link. In mathematical terms this can be expressed by the equation:

$$DR = DC + DL = \int D_1(z_1).dz_1 + \int D_2(z_2).dz_2 \quad (1)$$

in which $z_1$ and $Z_2$ are the abscissas of points respectively along the dispersion compensating fiber and along the associated link and $D_1$ and $D_2$ are the respective chromatic dispersion parameters at the abscissas $z_1$ and $z_2$ of the dispersion compensating fiber and of the fiber of the transmission link. The integrals which express the cumulative dispersions DC and DL are respectively calculated along the dispersion compensating fiber and along the associated transmission link fiber, taking the direction of propagation of the waves as the positive direction.

It will be remembered that the dispersion parameter D is related to the propagation constant $\beta$ by the equation:

$$d^2\beta/d\omega^2 = -(2\pi c/\omega^2)D,$$

in which $\omega$ is the angular frequency of the wave and c is the speed of light in a vacuum.

The condition for exact compensation of chromatic dispersion is therefore DR=DC+DL=0.

In reality exact compensation of chromatic dispersion is not always the optimum, because the quality of the compensated signal received also depends on other transmission parameters and in particular on how the transmitted signal is modulated. This applies in particular if the transmitted signal includes a "chirp", i.e. optical frequency modulation accompanying any amplitude modulation.

In fact, this kind of compensation is applied only when required, i.e. when transmission conditions (fiber type, modulation type, transmission distance and bit rates) would, if not compensated, lead to bit error rates exceeding a commercially acceptable limiting value, typically $10^{-15}$. Moreover, to minimize the cost of the dispersion compensating fiber, a minimum compensation value is normally chosen that is compatible with the required bit error rate. Thus for sufficiently short links no attempt is made to compensate chromatic dispersion.

Until now, the forms of compensation referred to above have been treated independently and without regard to another unfavorable phenomenon referred to as "polarization modal dispersion". Under current operating conditions for optical transmission systems, this phenomenon has long been considered as negligible compared to chromatic dispersion. This is no longer the case when the length, and most importantly the bit rate, of the links are to be increased further.

Even in the absence of chromatic dispersion in the usual sense, and although the carrier wave supplied by a laser diode in the transmitter is totally polarized, the fibers are the site of polarization dispersion which has the effect, for example, that a pulse emitted by the transmitter terminal is received in a distorted form after propagating in a fiber and has a duration greater than its original duration.

This distortion is due to the birefringence of the fibers, whose effect is that the optical signal is depolarized during transmission. To a first approximation, the signal received at the end of the link fiber can be considered as made up of two orthogonal components, one corresponding to a state of polarization for which the propagation speed is a maximum (fastest principal state of polarization) and the other corresponding to a state of polarization for which the propagation speed is a minimum (slowest principal state of polarization). In other words, the pulsed signal received at the end of the link fiber can be considered to be made up of a first pulsed signal which is polarized with a privileged state of polarization and arrives first and a second pulsed signal propagating with a retarded state of propagation and arriving with a delay referred to as the differential group delay (DGD) which depends in particular on the length of the link fiber.

The above two principal states of polarization (PSP) therefore characterize the link.

Consequently, if the transmitter terminal emits an optical signal consisting of a very short pulse, the optical signal received by the receiver terminal is made up of two successive pulses polarized orthogonally and having a relative time difference equal to the differential group delay. As detection by the terminal entails providing an electrical form of the measured total optical power received, the detected pulse has a temporal width increased as a function of the value of the differential group delay.

The delay can be in the order of 50 picoseconds for a standard fiber 100 kilometers long. The distortion of the pulses received by the receiver terminal can cause errors in decoding the transmitted data and polarization dispersion therefore constitutes a factor limiting the performance of optical links, whether analog or digital.

It is currently possible to manufacture monomode fibers with low polarization dispersion (approximately 0.05 ps/√km). However, the problem remains in the case of "standard fibers" already installed and which have very high polarization dispersion, constituting a major technical obstacle to increasing the transmitted bit rate. Also, this problem will arise again for low polarization dispersion fibers when it becomes necessary to increase the bit rate further.

It is also possible to manufacture fibers with high polarization dispersion, referred to as polarization maintaining fibers (PMF), which can be used in short sections to procure a fixed differential group delay with principal states of polarization that do not vary. By judiciously disposing a component of this kind (or any device generating a differential delay between two orthogonal modes of polarization) in series with a transmission link which is subject to polarization dispersion it is possible to achieve optical compensation of the polarization dispersion. This can be achieved either by using a polarization maintaining fiber with the same differential delay as the link, but interchanging the fast and slow principal states of polarization, or by causing a principal state of polarization of the combination of the link and the polarization maintaining fiber to coincide with the state of polarization of the source of emission. A polarization controller is used for this purpose and is inserted between the link and the polarization maintaining fiber.

One important aspect of polarization modal dispersion is that the value of the differential group delay and the principal states of polarization of a link vary in time as a function of many factors, such as vibration and temperature. Accordingly, unlike chromatic dispersion, polarization dispersion must be considered to be a random phenomenon. In particular, the polarization dispersion of a link is characterized by a polarization mode dispersion delay (PMD) defined as the average measured value of the differential group delay.

To be more precise, it can be shown that the polarization dispersion can be represented by a random rotation vector $\Omega$ in the Poincaré space in which the states of polarization are usually represented by a state of polarization vector S, referred to as the Stokes vector, whose end is situated on a sphere. FIG. 1 shows the principal vectors concerned: the state of polarization vector 5, the polarization dispersion vector $\Omega$ and the vector of the principal states of polarization e, $\Phi$ being the angle between S and $\Omega$.

The vectors e and $\Omega$ are in the same direction and the following equation applies: $\partial S/\partial \omega = \Omega \otimes S$, where $\omega$ is the angular frequency of the optical wave and the symbol $\otimes$ designates the vector product.

The modulus of $\Omega$ is the value of the group time difference, i.e. of the propagation delay between two waves polarized with the two main states of polarization of the link.

Another consequence of the random nature of the phenomenon is that a compensating system must be adaptive and the differential group delay of the polarization maintaining fiber must be made at least equal to the differential group delay values to be compensated. One such compensating system is described in European patent application EP-A-853 395 filed Dec. 30, 1997 and published Jul. 15, 1998.

A problem which has come to light in work on compensating PMD is that of the combined effects of polarization dispersion and chromatic dispersion. It has been found that in reality the efficacy of PMD compensation is highly sensitive to the residual chromatic dispersion value Dr of the link as a whole and therefore to the existence and the chosen value of chromatic dispersion compensation.

In particular, it has been found necessary to introduce precise chromatic dispersion compensation even for links where such compensation would not be necessary in the absence of PMD.

It has also been found that the optimum value of chromatic dispersion compensation to be applied in the presence of PMD does not always correspond to the optimum value of compensation that would be applied in the absence of PMD, for example in the case where the signal transmitted includes a "chirp".

This phenomenon can be explained by the fact that the method used to compensate PMD effects a first order compensation relative to the angular frequency $\omega$. In reality, the polarization dispersion vector $\Omega$ and the principal states of polarization depend on the angular frequency $\omega$ and this dependency becomes dominant when first order compensation is effected. The second order effects in respect of $\omega$ can in part be treated as additional chromatic dispersion induced by PMD. As PMD is random, this induced chromatic dispersion will in turn be random.

Accordingly, the object of the invention is to improve the efficacy of polarization compensation by allowing for the foregoing remark.

SUMMARY OF THE INVENTION

To this end, the invention provides a compensating system for an optical transmission system including a transmitter terminal emitting a polarized optical signal, a transmission optical fiber, optional optical amplifiers and a receiver terminal, the system including first polarization dispersion compensating means including:

at least one polarization controller, means for generating a differential group delay between two orthogonal polarization modes, the polarization controller and the differential group delay generator means being inserted between the transmission fiber and the receiver terminal, in that order, and a control unit for the polarization controller, and the system further including second compensating means inserted between the transmitter and receiver terminals and adapted to apply variable chromatic dispersion compensation, in which system the control unit is adapted to control at the some time the polarization controller and the second compensating means in accordance with a measurement parameter representative of the quality of the optical signal received by the receiver terminal and in such manner as to optimize the quality.

Dynamically controlling chromatic dispersion compensation, in the same manner as the polarization controller, not only compensates chromatic dispersion in the usual sense, which is practically fixed, but also compensates the random chromatic dispersion induced by PMD.

The compensation should ideally seek to obtain the maximum improvement in signal quality, in which case the direction of the principal states of polarization e of the link as a whole between the emitted signal and the received signal coincides at all times with the direction of the polarization vector S of the received signal. In other words, the angle Φ previously defined must be kept as small as possible.

However, in practice the efficacy of compensation is limited by the capabilities of current measuring, signal processing and actuator devices (polarization controller, variable chromatic dispersion compensator). Another limitation is the cost of such devices.

Another object of the invention is to propose an approach for solving this question of the rating of the compensator means according to the context of the transmission system and also the required performance.

According to this other aspect of the invention the control unit of the first and second compensating means has a response time and an accuracy such that the angle between the direction of the principal states of polarization of the link as a whole between the emitted signal and the received signal and the direction of the polarization vector of the received signal remains at all times below a given value enabling improvement of the quality relative to a transmission system with no compensation.

The maximum angle value can be determined by experiment.

Accordingly, according to one particular aspect of the invention, the control means are rated so that this angle remains below 10 degrees and preferably below 3 degrees.

According to other features of the invention, the measurement parameter is the degree of polarization of the received optical signal or the spectral width of the modulation of the electrical signal obtained by detecting the received optical signal and the control means are adopted to maximize this parameter.

According to a variant which improves the efficacy of compensation, the measuring parameter is the weighted product of the degree of polarization of the received signal by the spectral width of the modulation of the electrical signal obtained by detecting the received signal, and the control means are adapted to maximize this product.

The invention also provides an optical transmission system incorporating the compensating system defined hereinabove. The system can be a single-channel system, i.e. a system designed to convey a signal conveyed by a single carrier wavelength, or a wavelength division multiplex (WDM) system, i.e. a system designed to convey a signal made up of a plurality of channels with different carrier wavelengths. In the latter case, specific compensation must be applied to each channel. To this end the system according to the invention includes means for extracting a channel at the receiver and a compensating system associated with that channel.

Other features and advantages of the invention will become apparent in the course of the following description, which is given with reference to the accompanying drawings.

BRIEF DESCRIPTION OF THE DRAWINGS

FIG. 1 shows the Poincare space already commented on.

FIG. 2 shows an optical transmission system including a compensating system according to the invention.

FIG. 3 shows control means of the compensating system according to the invention in more detail.

DETAILED DESCRIPTION OF THE PREFERRED EMBODIMENT

FIG. 2 shows diagrammatically and by way of example an optical transmission system equipped with a compensating system according to the invention.

The example shown is a wavelength division multiplexed system designed to convey a plurality of channels Seλ, Seλ', Seλ", with respective carrier wavelengths λ, λ', λ". Each channel, for example channel Seλ, comes from a transmitter terminal TX emitting an optical signal taking the form of amplitude modulation and/or optical frequency modulation of a polarized carrier wave. The channels are combined in a multiplexer 1 whose output is connected to an optical transmission link. That link typically comprises an optical fiber LF and can incorporate optical amplifiers (not shown) at the upstream and/or downstream end of the fiber. The link can also be made up of a plurality of sections of fiber between which optical amplifiers are placed.

The end of the link is connected to at least one receiver terminal, for example a terminal RX, via a demultiplexer 2 whose function is to extract the channel Srλ addressed to the receiver RX.

The system includes polarization dispersion compensating means CM between the demultiplexer 2 and the receiver RX and including:
- at least one polarization controller PC,
- means DDG for generating a differential group delay (DGD) between two orthogonal modes of polarization, and
- a control unit CU of the polarization controller PC.

An example of detailed implementation of the compensator CM and the corresponding explanations are given in the European patent application EP-A-853 395 previously cited. The control unit CU is adopted to maximize the degree of polarization of the signal from the differential group delay system, which is typically a polarization maintaining fiber (PMF). Other control methods intended to minimize the bit error rate can be used, for example control methods intended to minimize the spectral width of the modulation of the electrical signal obtained by detecting the optical signal from the differential group delay system. The weighted product of the preceding two parameters, i.e. a parameter p of the form $DOP^x.\Delta\omega^y$, where DOP is the degree of polarization, $\Delta\omega$ the spectral width and x and y are weighting coefficients optimized for the transmission system concerned, can advantageously be used as a measurement parameter. According to the invention, the compensation system is completed by chromatic dispersion compensating means DCM which comprise, for example, a first dispersion compensating fiber DCF0 on the upstream side of the demultiplexer 2 and in series with the transmission fiber (LF) and a variable dispersion compensating fiber DCF1 between the demultiplexer 2 and the receiver RX. This enables DCF0 to apply compensation common to all the channels and DCF1 to apply dynamic compensation specific to each channel. The variable dispersion compensating fiber is a fiber provided with a "chirped" Bragg grating, for example, to which a variable tension is applied by a piezoelectric actuator.

A single-channel system is distinguished from the previous system by the absence of the multiplexer 1 and the demultiplexer 2.

Ignoring other phenomena, such as non-linear effects, the location of the dispersion compensating fiber(s) which constitute(s) the chromatic dispersion compensating means DCM is not decisive because only the value of the residual chromatic dispersion of the link as a whole is important. However, for practical reasons, it can be preferable to place the dispersion compensating fiber(s) near the receiver.

A conventional approach to determining the chromatic dispersion compensation to be applied is to choose a fixed value. However, this method is no longer generally acceptable if allowance is made for the PMD. Note in contrast that chromatic dispersion compensation values are adjusted dynamically in response to the random behavior of the PMD.

FIG. 3 shows in more detail the control unit CU of the compensating system according to the invention.

It includes an opto-electronic interface OE whose input receives a portion of the signal Sr$\lambda$ from the differential group delay system. The output of this interface is connected to a processor unit PU via an analog-to-digital converter ADC. The outputs of the processor unit PU control the polarization controller PC and the dispersion compensating fiber DCF1 via a digital-to-analog converter DAC.

The function of the interface OE is to generate the measurement parameter p representative of the quality of the signal Sr$\lambda$, for example the degree of polarization of the signal Sr$\lambda$. The processor unit PU is programmed to execute an optimization algorithm for determining the commands to be applied to the polarization controller PC and to the dispersion compensating fiber DCF1 in order for the parameter p to be maintained at an extreme value corresponding to the maximum quality of the signal Sr$\lambda$.

The optimization algorithm is of the multidimensional type so that it can drive at the same time the dispersion compensating fiber and at least two variable parameters of the polarization controller. Many algorithms of this type are available, and an algorithm designed to use the Powell method can be used, for example, as described in pages 412 to 420 of "Numerical Recipes in C" by William H. Press et al, Cambridge University Press, 1994.

The performance of the regulation loop as a whole must be adapted to the PMD problem. In particular, the response time must be compatible with the speed at which the PMD fluctuates in practice. Also, it must be sufficiently accurate to achieve an improvement, and the accuracy depends on the required level of improvement. This condition in respect of the accuracy may be expressed by stating that the angle $\Phi$ between the direction e of the principal states of polarization of the link as a whole between the emitted signal Se$\lambda$ and the received signal Sr$\lambda$ and the direction of the polarization vector S of the received signal Sr$\lambda$ must remain at all times below a given value enabling an improvement in the quality of the signal compared to a transmission system with no compensation.

Experiments show that this angle must generally be less than 10 degrees and preferably less than 3 degrees.

Knowing that the polarization vector S can rotate up to 50 times per second, the minimum response time to be imposed on the regulation loop can be deduced, as appropriate to the required signal quality. In practice, the response time must be less than one millisecond, for example.

What is claimed is:

1. A compensating system for an optical transmission system including a transmitter terminal emitting a polarized optical signal, a transmission optical fiber and a receiver terminal, said system comprising:
   a first dispersion compensating means comprising:
      at least one polarization controller,
      means for generating a differential group delay between two orthogonal polarization modes, said polarization controller and said differential group delay generator means being inserted between said transmission fiber and said receiver terminal, in that order, and
      a control unit for said polarization controller, and
   a second dispersion compensating means inserted between said transmitter and receiver terminals and adapted to apply variable chromatic dispersion compensation, wherein said control unit is adapted to control at the same time said polarization controller and said second dispersion compensating means in accordance with a measurement parameter representative of the quality of the optical signal received by said receiver terminal and in such manner as to optimize said quality.

2. The compensating system claimed in claim 1 wherein said control unit of said first and second dispersion compensating means has a response time and an accuracy such that an angle between the direction of the principal states of polarization between the emitted signal and the received signal and the direction of the polarization vector of the received signal remains at all times below a given value.

3. The compensating system claimed in claim 2 wherein said control unit is adapted to maintain said angle at a value less than 10 degrees.

4. The compensating system claimed in claim 3 wherein said control unit is adapted to maintain said angle at a value less than 3 degrees.

5. The compensating system claimed in claim 1 wherein said measurement parameter is the degree of polarization of said received signal and said control unit is adapted to maximize the degree of polarization.

6. The compensating system claimed in claim 1 wherein said measuring parameter is the spectral width of the modulation of the electrical signal obtained by detecting said received signal and said control unit is adapted to maximize the spectral width.

7. The compensating system claimed in claim 1 wherein said measuring parameter is the weighted product of the degree of polarization of said received signal by the spectral width of the modulation of the electrical signal obtained by detecting said received signal and said control unit is adapted to maximize said product.

8. An optical transmission system including a compensating system as claimed in claim 7.

9. An optical transmission system including a compensating system as claimed in claim 1.

10. An optical transmission system for signals made up of a plurality of wavelength division multiplexed channels, said system including extraction means at the receiving end for extracting at least one of said channels and at least one compensating system as claimed in claim 9 associated with said extracted channel.

11. An optical transmission system for signals made up of a plurality of wavelength division multiplexed channels, said system including extraction means at the receiving end for extracting at least one of said channels and at least one compensating system as claimed in claim 1 associated with said extracted channel.

12. The optical transmission system claimed in claim 10, said system further comprising a fixed dispersion compensating fiber upstream of said extractor means and in series with said transmission optical fiber.

13. A compensating system for an optical transmission system including a transmitter terminal emitting a polarized optical signal, a transmission optical fiber and a receiver terminal, said system comprising:

a dispersion compensator comprising:
at least one polarization controller,
a polarization maintaining fiber that generates a differential group delay between two orthogonal polarization modes, said polarization controller and said polarization maintaining fiber being inserted between said transmission fiber and said receiver terminal, in that order, and
a control unit for said polarization controller, and
a variable dispersion compensation fiber inserted between said transmitter and receiver terminals and adapted to apply variable chromatic dispersion, wherein said control unit is adapted to control at the same time said polarization controller and said variable dispersion compensation fiber in accordance with a measurement parameter representative of the quality of the optical signal received by said receiver terminal and in such manner as to optimize said quality.

14. The compensating system claimed in claim 13 wherein said control unit of said dispersion compensator and said variable dispersion compensation fiber has a response time and an accuracy such that an the angle between the direction of the principal states of polarization between the emitted signal and the received signal and the direction of the polarization vector of the received signal remains at all times below a given value.

15. The compensating system claimed in claim 14 wherein said control unit is adapted to maintain said angle at a value less than 10 degrees.

16. The compensating system claimed in claim 15 wherein said control unit is adapted to maintain said angle at a value less than 3 degrees.

17. The compensating system claimed in claim 13 wherein said measurement parameter is the degree of polarization of said received signal and said control unit is adapted to maximize the degree of polarization.

18. The compensating system claimed in claim 13 wherein said measuring parameter is the spectral width of the modulation of the electrical signal obtained by detecting said received signal and said control unit is adapted to maximize the spectral width.

19. The compensating system claimed in claim 13 wherein said measuring parameter is the weighted product of the degree of polarization of said received signal by the spectral width of the modulation of the electrical signal obtained by detecting said received signal and said control unit is adapted to maximize said product.

20. An optical transmission system for signals made up of a plurality of wavelength division multiplexed channels, said system including a demultiplexer at the receiving end for extracting at least one of said channels and at least one compensating system as claimed in claim 13, said optical transmission system further comprising a fixed dispersion compensating fiber upstream of said extractor means and in series with said transmission optical fiber.

* * * * *